United States Patent
Fasske

Patent Number: 5,943,930
Date of Patent: Aug. 31, 1999

[54] APPARATUS FOR SHEARING MULTI-WALLED WORKPIECES

[76] Inventor: Wayne C. Fasske, 34 Desorbo Dr., Southington, Conn. 06489

[21] Appl. No.: 08/777,939

[22] Filed: Dec. 23, 1996

[51] Int. Cl.$^6$ ........................................... B26D 7/02
[52] U.S. Cl. .................. 83/456; 83/465; 83/453; 83/468.7
[58] Field of Search ............... 83/456, 453, 465, 83/468.7

[56] References Cited

U.S. PATENT DOCUMENTS

| | | |
|---|---|---|
| 53,416 | 3/1866 | Cole . |
| 175,182 | 3/1876 | Slusser et al. . |
| 257,286 | 5/1882 | Bruce . |
| 284,496 | 9/1883 | Seymour . |
| 606,261 | 6/1898 | Yates ........................................ 83/468.7 |
| 1,884,001 | 10/1932 | Lewis ........................................ 83/456 |
| 3,851,557 | 12/1974 | Viestraete ................................. 83/465 |
| 3,877,690 | 4/1975 | Owens ..................................... 83/465 |
| 3,895,551 | 7/1975 | Goransson ............................... 83/465 |
| 3,938,413 | 2/1976 | Goettel et al. . |
| 3,956,952 | 5/1976 | Goettel et al. . |
| 4,218,946 | 8/1980 | Witzler . |
| 4,337,680 | 7/1982 | Borzym .................................... 83/456 |
| 4,338,839 | 7/1982 | Farrel, Sr. et al. . |
| 4,338,840 | 7/1982 | Farrell, Sr. et al. . |
| 4,437,374 | 3/1984 | Borzym .................................... 83/456 |
| 4,659,029 | 4/1987 | Rodriguez . |
| 4,831,910 | 5/1989 | Poulsen . |
| 4,846,029 | 7/1989 | Gardner ................................... 83/456 |
| 4,848,723 | 7/1989 | Borzym .................................... 83/456 |
| 4,872,384 | 10/1989 | Borzym .................................... 83/456 |
| 5,090,285 | 2/1992 | Kondô . |
| 5,105,703 | 4/1992 | Kondô . |
| 5,125,306 | 6/1992 | Borzym .................................... 83/456 |
| 5,161,444 | 11/1992 | Kusakabe et al. ....................... 83/456 |
| 5,463,920 | 11/1995 | Korb . |

*Primary Examiner*—M. Rachuba
*Assistant Examiner*—Sean Pryor
*Attorney, Agent, or Firm*—Cummings & Lockwood

[57] ABSTRACT

In an apparatus for shearing multi-walled workpieces, such as metal framing studs, a pair of base supports are spaced relative to each other to define a blade gap therebetween, and a guillotine-like blade is slidably received within the gap for shearing the workpieces. A pair of first supports, each defining a plurality of first support surfaces, are each slidably mounted on a respective base support. A pair of second supports, each defining a plurality of second support surfaces, are also each slidably mounted on a respective base support, and the second supports are spaced apart from and face the first supports to thereby define an adjustable-width channel therebetween. Each of the first, second and base supports defines a blade-like edge located adjacent to and defining the blade gap. An elongated, multi-walled workpiece, such as a framing stud, is received within the channel, and the first and second support surfaces are each moved into contact with a respective wall of the workpiece to support the workpiece. The guillotine-like blade is then driven downwardly into engagement with the workpiece, and the V-shaped cutting edge of the blade cooperates with the blade-like edges of the adjustable supports to shear the workpiece along a line of contact.

24 Claims, 4 Drawing Sheets

APPARATUS FOR SHEARING MULTI-WALLED WORKPIECES

FIELD OF THE INVENTION

The present invention relates to apparatus for cutting sheet-like material, and more particularly, to apparatus for shearing workpieces of different sizes and shapes having at least two walls formed of sheet-like material, such as metal framing studs and eavestroughs.

BACKGROUND INFORMATION

Metal framing studs are used in the building industry, and particularly the commercial building industry, for constructing framework and mounting thereto wallboards formed of sheet rock and other types of materials. Although framing studs may be formed in a variety of different shapes and configurations, a common type of stud is formed of metal, and defines a back wall and two parallel side walls forming a generally U-shaped cross section. Commercially-available studs are supplied in standard lengths, and therefore if a non-standard length is required, a standard stud must be trimmed, frequently by the builder, to the desired length.

Stud trimming is often performed at job sites by employing a chop saw having an abrasive wheel, disk or like rotatably-driven blade, which is pivotally mounted on a base for movement into and out of engagement with a workpiece. The chop saw blades can wear relatively quickly, particularly when used to cut heavy-gauge workpieces. In addition, because of limitations in blade size, many chop saws cannot cut through relatively large-width studs with a single cutting stroke, but rather require the stud to be flipped over after cutting through one side, and then cut again in order to cut through its entire width. Use of a chop saw to trim framing studs or like workpieces can therefore be a relatively time-consuming, labor-intensive and expensive operation, particularly at large job sites or jobs otherwise requiring a large number of studs or like workpieces to be trimmed.

Manufacturers of framing studs, eavestroughs or like workpieces have employed machines for shearing such workpieces to their desired lengths at the time of manufacture. A typical such machine employs a guillotine-like cutting blade slidably received within a blade gap, and a pair of die plates mounted on opposite sides of the guillotine relative to each other for slidably receiving and supporting the workpiece during a cutting operation. Each die plate defines an aperture which is shaped to conform to the shape of a respective type and size of workpiece for conformably engaging the workpiece. A typical such apparatus is shown in U.S. Pat. No. 4,218,946 to Witzler, entitled "Cutter Assembly For Eavestrough-Forming Machine".

One of the drawbacks of these types of conventional shearing machines is that they cannot be conveniently employed for cutting a variety of different pre-manufactured studs, eavestroughs or like workpieces. Each die plate typically forms an aperture defining a fixed shape and dimension conforming to a manufacturer's particular type and size of workpiece, and therefore can only be used with the respective type of workpiece. In addition, framing studs and like workpieces frequently become bent or otherwise slightly deformed during transportation, thus preventing such workpieces from being received within their corresponding die plates. Accordingly, although such a machine could be used to cut a variety of framing studs or like workpieces by providing a variety of die plates having apertures of different shapes and configurations, this would not only be relatively expensive, but any slightly deformed workpieces could not be received within the die plates, and thus could not be cut by the machine.

Accordingly, it is an object of the present invention to overcome the drawbacks and disadvantages of the above-described machinery for cutting metal studs, eavestroughs or like multi-walled workpieces.

SUMMARY OF THE INVENTION

The present invention is directed to an apparatus for shearing workpieces having at least two sides formed of sheet-like material, such as framing studs or eavestroughs, comprising at least one first support defining a first support surface engageable with a first side of the workpiece, and at least one second support defining a second support surface engageable with a second side of the workpiece. Each second support surface is spaced apart from and faces a corresponding first support surface, and thereby defines a channel between the first and second support surfaces for receiving the workpiece. At least one of the first and second support surfaces is movable relative to the other, and preferably all of the first and second support surfaces are movable relative to each other, for engaging with each support surface the respective sides of workpieces of different widths. A blade gap is formed adjacent to the first and second support surfaces, and a guillotine-like blade is slidably received within the blade gap and movable between a first position spaced away from the workpiece received within the channel, and a second position in engagement with the workpiece for shearing the workpiece along a line of contact.

In a preferred embodiment of the present invention, the apparatus includes two base supports spaced relative to each other and defining the blade gap therebetween; two first supports, each mounted on a respective base support and further defining the blade gap therebetween; and two second supports, each mounted on a respective base support and further defining the blade gap therebetween. The base supports also define a third support surface extending between the first and second support surfaces and engageable with a third side of the workpiece. Preferably, each base support defines an elongated groove having, for example, a dove-tail shape, and each of the first and second supports includes a corresponding mounting surface, such as a dove-tail flange received within the corresponding dove-tail groove, for permitting movement of the first and second supports relative to each other to thereby adjust the width of the channel to accommodate workpieces of different widths.

One advantage of the apparatus of the present invention, is that it is adaptable to rapidly and effectively shear a variety of workpieces, such as framing studs, having different sizes, shapes and/or configurations.

Other objects and advantages of the present invention will become apparent in view of the following detailed description and accompanying drawings.

DETAILED DESCRIPTION OF THE PREFERRED EMBODIMENTS

Figure 1:
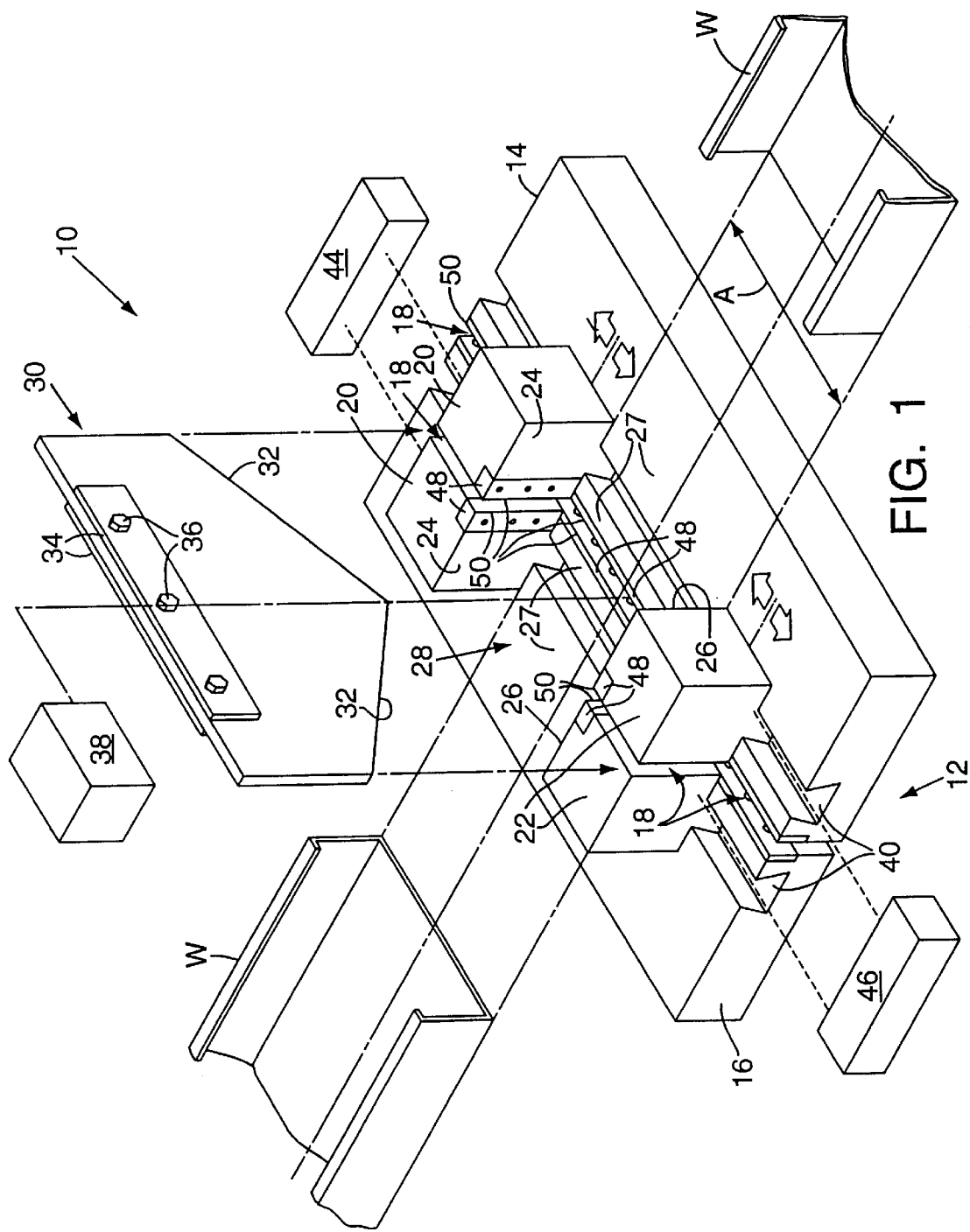
FIG. 1 is a partial schematic, perspective view of an apparatus embodying the present invention for cutting framing studs, or like multi-sided workpieces, of different widths and/or configurations.

In FIG. 1, an apparatus embodying the present invention is indicated generally by the reference numeral 10. The apparatus 10 comprises a base assembly 12 including a first base support 14, and a second base support 16 spaced apart from the first base support to define a blade gap 18 therebetween. A pair of first supports 20 are each movably mounted on one side of the first and second base supports 14 and 16, respectively, and a pair of second supports 22 are each movably mounted on the opposite sides of the first and second supports, respectively. Each first support 20 defines at least one first support surface 24 for engaging a first side of a workpiece "W", and each second support 22 defines at least one second support surface 26 for engaging a second side of the workpiece W. Each base support 14 and 16 similarly defines a third support surface 27 extending between the first and second support surfaces 24 and 26, respectively, for engaging and supporting a third side of the workpiece. As also shown in FIG. 1, the first support surfaces 24 are spaced apart from and face the second support surfaces 26, thus defining a channel 28 therebetween for receiving the workpiece W. In accordance with the present invention, at least one of the first and second support surfaces 24 and 26, respectively, is movable relative to the support surface on the opposite side of the channel 28 for adjusting the width "A" of the channel to thereby engage with each support surface the respective sides of workpieces of different widths.

As shown in FIG. 1, each first support 20 is mounted adjacent to the inner edge of the respective base section 14 or 16 so that the two first supports are closely spaced relative to each other to further define the blade gap 18 therebetween. Similarly, the two second supports 22 are each mounted adjacent to the inner edge of the respective base support, and are closely spaced relative to each other to further define the blade gap 18 therebetween.

A guillotine-like blade 30 is slidably received and retained within the blade gap 18 so that it is either in sliding contact with, or spaced immediately adjacent to the surfaces of the first, second and base supports forming the blade gap. As shown in FIG. 1, the blade 30 is approximately planar, and defines on its lower edge an elongated, approximately V-shaped cutting edge 32. A support flange 34 is fixedly secured to the upper edge of the blade 30 by suitable fasteners 36, and as shown schematically in FIG. 1, a suitable drive source 38 is coupled to the support flange 34 of the blade. As indicated by the arrows and described in further detail below, the drive source 38 is adapted to drive the blade 30 downwardly into engagement with a workpiece W received within the channel 28 to shear the workpiece, and to drive the blade upwardly within the channel during non-use so that it is spaced above either the third support surface 27 of the base, or a workpiece W seated on the third support surface. As will be recognized by those skilled in the pertinent art, the drive source 38 may take the form of any of numerous different drive sources that are currently or later become known to those of ordinary skill in the pertinent art, such as a lever and linkage assembly or like mechanical drive system, a hydraulic or pneumatic drive system employing one or more hydraulic or pneumatic cylinders coupled to the blade, or an electric motor coupled to the blade through a suitable drive train, such as a linkage assembly, belt drive or gear train (not shown).

In the preferred embodiment of the present invention, and as indicated by the arrows in FIG. 1, each of the first supports 20 and second supports 22 are movable laterally relative to the others and the third support surface 27 in order to adjust, for example, the width "A" of the channel 28 and thereby accommodate workpieces of different widths. Accordingly, the apparatus 10 includes means for moving the supports laterally relative to each other, including moving one of the pairs of first and second supports relative to the other, or for moving both pairs of first and second supports relative to each other. As shown typically in FIG. 2, each base support 14 and 16 defines an elongated mounting recess or groove 40 spaced adjacent to and extending approximately parallel to the blade gap 18. Each of the first and second supports 20 and 22, respectively, defines a corresponding mounting surface 42 or 42', respectively, slidably received within the respective mounting recess for moving the respective support along the recess.

Figure 2:
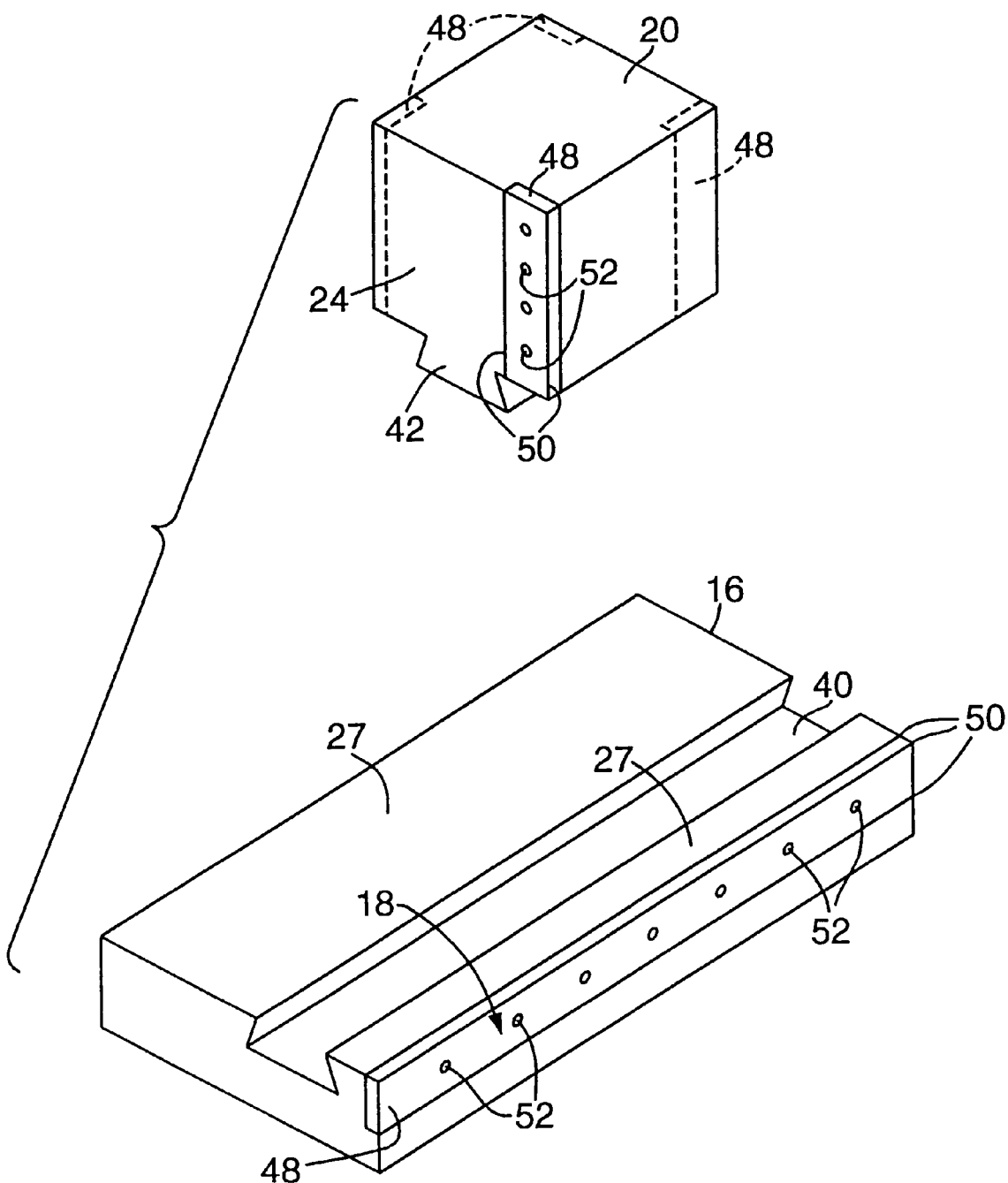
FIG. 2 is an exploded perspective view of a typical base and side support of the apparatus of FIG. 1.

As shown typically in FIG. 2, in the embodiment of the present invention illustrated, each mounting surface 42 and 42' is shaped in the form of a dove-tail flange projecting downwardly from the underside of the respective support, and extending along the width of the support. Similarly, the mounting recesses 40 are each correspondingly shaped in the form of a dove-tail groove for slidably receiving and retaining the dove-tail flanges 42 and 42'. As will be recognized by those skilled in the pertinent art, the illustrated means for moving the supports is only exemplary, and numerous other structures may equally be employed. For example, the mounting recesses and mounting surfaces or flanges of the supports may take any of numerous different shapes and/or configurations; alternatively, the recesses may be formed in the first and second supports, and the elongated flanges may in turn be formed by the base supports.

In the embodiment of the present invention illustrated, the first supports 20 and second supports 22 are solid, and formed of metal, such as steel, and are therefore substantially heavier than the typical workpiece W shown in FIG. 1. Accordingly, with this type of construction it may not be necessary to include means for fixedly securing the supports once moved into engagement with the respective sides of the workpiece. If necessary, however, a stop or like clamping mechanism (not shown) may be employed with each of the first and second supports for locking each support in place once moved within the respective groove into its desired position.

Alternatively, the apparatus 10 may further include means for driving either one pair of the first and second supports, or for driving both pairs of first and second supports. As shown schematically in FIG. 1, a first drive source 44 is coupled to the pair of first supports laterally 20 for moving the supports within the grooves 40, and a second drive source 46 is coupled to the second pair of supports 22 for moving the second supports laterally within the grooves. The drive sources 44 and 46 may be any of numerous suitable drive sources known to those of ordinary skill in the pertinent art, and each may include, for example, an electric motor coupled to one or both supports by a suitable drive train (not shown), such as a rack and pinion, worm gear, toothed belt and pulley, or lead screw arrangement. A manual drive system could likewise be employed, including, for example, a hand-wheel or crank coupled through a suitable drive train, such as a rack and pinion or lead screw arrangement, to the respective supports. In either case, each support may be independently driven, or each support pair may be simultaneously driven by the respective drive source.

As also shown in FIGS. 1 and 2, each of the first, second and base supports includes at least one blade-like edge formed adjacent to and defining the blade gap 18. As shown typically in FIG. 2, each of the base supports 14 and 16, and first and second supports 20 and 22, respectively, includes at least one blade bar 48' and 48, respectively, removably attached to a corner of the support forming the blade gap 18, and each blade bar defines a plurality of elongated blade-like edges 50. Each blade bar 48 and 48' extends along substantially the entire extent of the respective corner of the support, and thus defines a respective cutting edge 50 for shearing the workpiece W in cooperation with downward movement of the guillotine-like blade 30. Each blade bar 48 and 48' is removably attached to the respective support by a plurality of fasteners, shown typically at 52 in FIG. 2. Accordingly, when one of the blade-like edges 50 becomes worn, a new blade-like edge of the bar may be employed by releasing the respective fasteners 52, turning the bar on the support to present the new blade-like edge to the gap, and securing the fasteners in order to fixedly secure the bar and edge in place.

As may be recognized by those skilled in the pertinent art, each blade-like edge 50 may likewise be formed by the respective corner of the support. In this case, each support is hardened to form on its corners durable and effective blade-like edges. In addition, as shown typically in phantom lines in FIG. 2, each of the first and second supports 20 and 22, respectively, may include a plurality of blade bars 48 mounted on each of the corners of the support. In this case, each of the first and second supports may be removed, rotated, and re-mounted on the respective base support in order to present the different corners of the support, and thus the different blade bars, to the blade gap 18. Alternatively, rather than rotate the supports, the blade bars may be interchanged with one another without removing the first and second supports from the base supports. In addition, the apertures formed in each blade bar 48 and 48' for receiving the fasteners 52 may each define an elongated or other shape in order to permit a fine adjustment of the position of the blade bar on the respective support.

The workpiece W shown in FIG. 1 is in the form of a typical framing stud, defining a back wall and two parallel side walls forming a generally U-shaped cross section. Accordingly, when this type of workpiece is received within the channel 28, the back wall of the stud is seated in engagement with the third support surface 27 of the base assembly, and the two side walls of the stud are each seated in engagement with the support surfaces of the first or second supports, respectively. However, as will be recognized by those skilled in the pertinent art, the apparatus of the present invention is adaptable for use with a variety of different types of framing studs, eavestroughs and other types of workpieces. In addition, although the typical framing stud W is made of metal, the apparatus of the present invention may also be used to shear workpieces formed of other types of materials, including any of numerous different types of polymers, cardboard, paper, wood, or laminations formed of one or more of these or like materials.

In the operation of the apparatus of the present invention, a workpiece, such as the workpiece W in the form of a typical framing stud, is received within the channel 28 with its back wall seated in contact with the third support surface 27. The first supports 20 and second supports 22 are then moved inwardly toward each other until the first and second support surfaces 24 and 26, respectively, are moved into contact with the side walls of the workpiece to prevent any lateral movement of the workpiece within the channel. The point at which the workpiece is to be cut is then placed over the blade gap 18, and the blade 30 is then driven downwardly by the drive source 38 into engagement with workpiece. The apex or lowermost point of the V-shaped cutting edge 32 of the blade first pierces the center of the back wall of the workpiece, and then as the blade is driven downwardly, the inclined cutting edge 32 of the blade cooperates with the blade-like edges 50 of the base supports 14 and 16, and first and second supports 20 and 22 to rapidly shear the stud outwardly from its centerline. Thin strips of scrap material, each having a width slightly less than that of the blade gap 18, are peeled away from the workpiece along the line of contact of the blade, and in turn fall through the portion of the blade gap between the two base supports. The illustrated V-shaped blade configuration is particularly advantageous in rapidly cutting and preventing deformation of the workpiece. Once the supports 20 and 22 are set in place, like workpieces may then be rapidly fed through the apparatus and trimmed to their desired lengths in the same manner.

In order to accommodate workpieces having a shape substantially different than that of the workpiece W of FIG. 1, it may be desirable to provide means for adjusting the angular positions of the first support surfaces 24 and/or the second support surfaces 26 relative to the third support surface 27 in order to better conform the support surfaces to the external shape of the workpiece. This may be accomplished, for example, by providing each of the first and second supports with a plurality of support surfaces oriented at different angles relative to the base support surface, as shown in FIG. 3, or by providing each of the first and second supports with adjustable support surfaces for adjusting the angular relationship of each support surface relative to the base support surface, as shown in FIG. 4.

Figure 3:
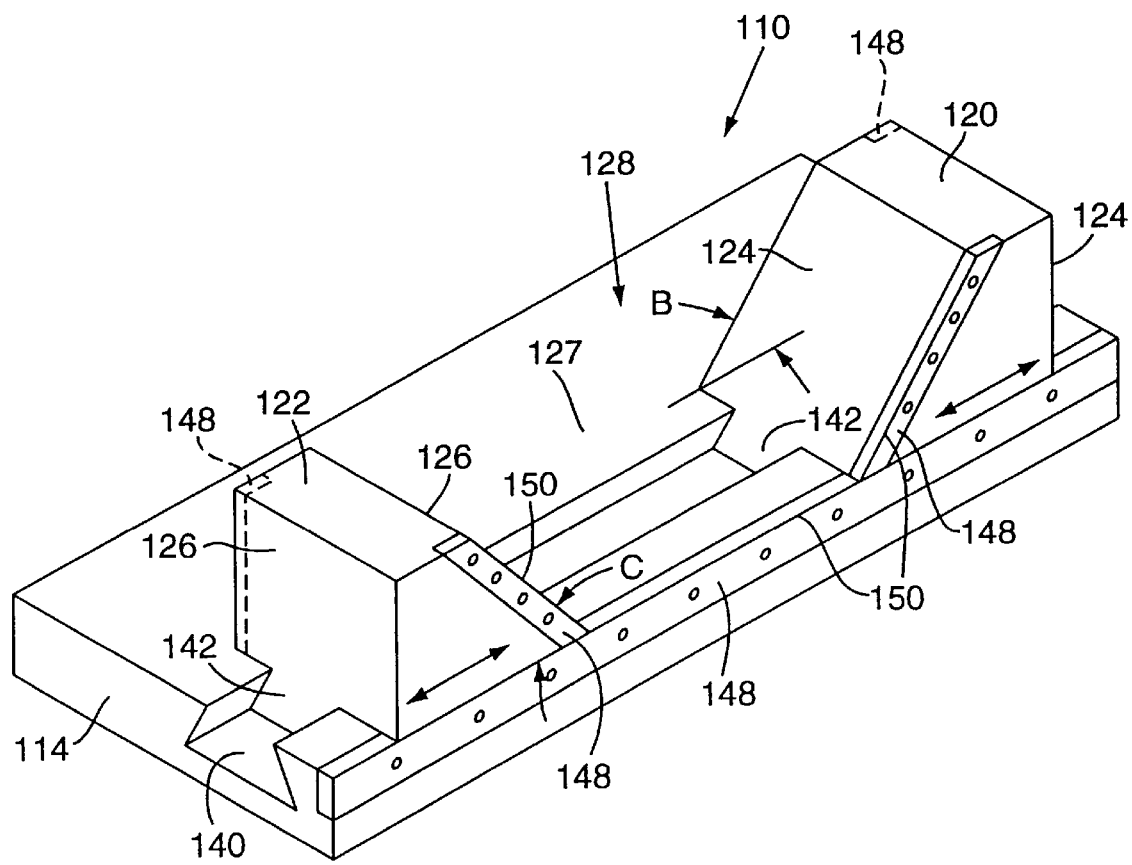
FIG. 3 is a perspective view of the typical base, first and second supports of another embodiment of an apparatus of the present invention wherein each of the first and second supports includes a plurality of support surfaces oriented at different angles relative to the base support surface for accommodating workpieces of varying configurations.

Turning first to FIG. 3, the apparatus 110 is substantially the same as the apparatus 10 described above, and therefore like reference numerals preceded by the numeral 1 are used to indicate like elements. Each of the first and second supports 120 and 122, respectively, includes four support surfaces 124 or 126 on the four vertical sides of the support, and each of the first and second support surfaces may be formed at a predetermined angle relative to the base support surface 127. As shown typically in FIG. 3, one of the first support surfaces 124 is oriented at a predetermined acute angle "B" relative to the base support surface 127, and one of the second support surfaces 126 is oriented at a predetermined acute angle "C" relative to the base support surface. The angles "B" and "C" may be equal, as shown, or each may be another angle selected to conform to the shape of a desired workpiece. Similarly, other support surfaces (not shown) may be oriented at different predetermined angles, as desired, in order to accommodate workpieces of different configurations. The first and second supports 120 and 122, respectively, may be removed and rotated on the base supports in the same manner as described above with respect to the previous embodiment in order to present each of the different support surfaces to the channel 128.

Figure 4:
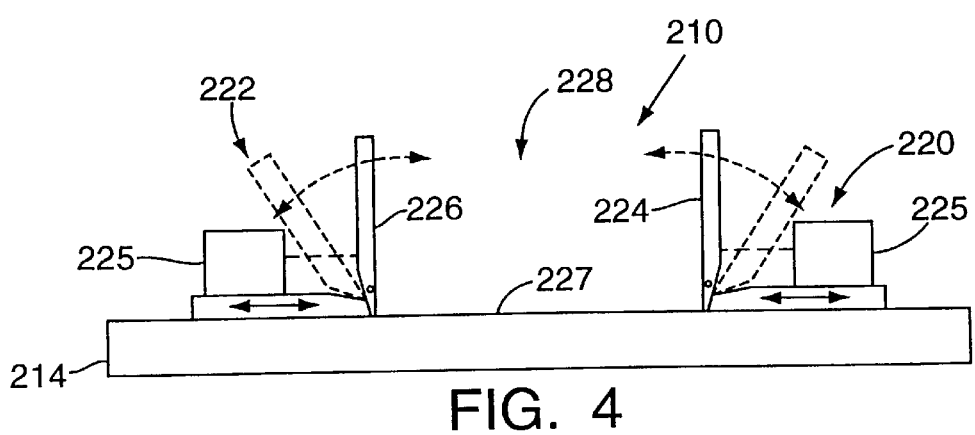
FIG. 4 is a schematic, front elevational view of another embodiment of an apparatus of the present invention wherein the first and second supports include adjustable support surfaces for adjusting the angular relationship of each support surface relative to the base support surface in order to accommodate workpieces of varying configurations.

Turning to FIG. 4, the apparatus 210 is substantially the same as the apparatus 10 described above, and therefore like reference numerals preceded by the numeral 2 are used to indicate like elements. In this embodiment, each of the first and second supports 220 and 222 includes an adjustable support surface 224 or 226 for adjusting the angular orientation of the support surface relative to the base support surface 227 in order to accommodate workpieces of varying configurations. As shown in FIG. 4, the first and second support surfaces 224 and 226 are each pivotally mounted on the respective base of the support, and an angular adjustment drive 225 is coupled to each of the first and second support surfaces for adjusting their angular positions. Accordingly, as indicated by the arrows, and the exemplary illustration in phantom lines of FIG. 4, each support surface may be pivotally adjusted on the base of the respective support in order to conform to the external configurations of a variety of different workpieces. The angular adjustment drives 225 may be any of various drive systems known to those of ordinary skill in the pertinent art, and each may include, for example, a hand-wheel or crank coupled through a suitable gear train, such as a worm gear arrangement, to the respective support surface for adjusting its angular position; or may likewise include an electric motor coupled through a like gear train to each support surface for adjusting its angular position (not shown).

Figure 5:
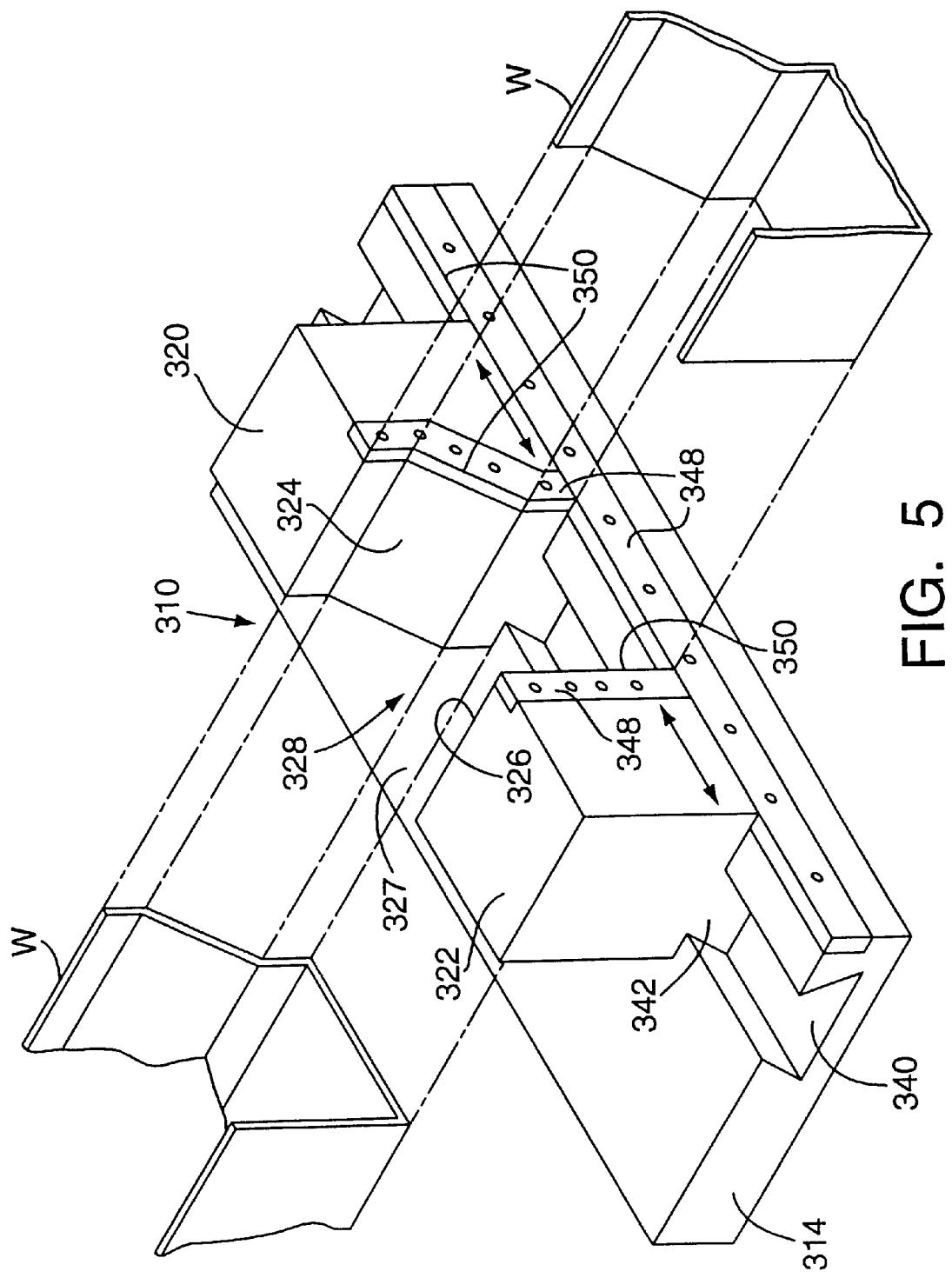
FIG. 5 is a perspective view of the typical base, first and second supports of another embodiment of an apparatus of the present invention wherein each of the first supports defines at least one non-planar support surface configuration for better conforming to the external surfaces of a workpiece.

In FIG. 5, the apparatus 310 is substantially the same as the apparatus 10 described above, and therefore like reference numerals preceded by the numeral 3 are used to indicate like elements. The primary difference of this embodiment is that at least one of the support surfaces defines a non-planar shape in order to better conform to the external configuration of a workpiece. In the example of FIG. 5, the right side of the workpiece W defines a non-planar surface configuration, and at least one of the first support surfaces 324 defines a shape substantially conforming to this non-planar shape. The respective blade bar 348 of the first support surface likewise defines a substantially-conforming shape. As will be recognized by those skilled in the pertinent art, other support surfaces may define other planar or non-planar shapes in order to approximately conform to, and thereby support other commonly-encountered workpieces.

As will be recognized by those skilled in the pertinent art, numerous changes and modifications may be made to the above-described and other embodiments of the present invention, without departing from its scope as defined in the appended claims. For example, the first and second base supports may be adjustable relative to each other in order to thereby adjust the thickness or width of the blade gap. Alternatively, the first and second base supports may be formed by a single or unitary support having an elongated slot or groove forming the blade gap. Similarly, each pair of first and second supports may be connected together, or formed as a single or unitary support, which may in turn be driven by a common drive source. The support surfaces may likewise be formed in any of numerous different shapes and/or configurations in order to better conform to, and thereby fixedly support a workpiece to effect a cutting operation as described above. The configuration of the support surfaces need not exactly conform to the configuration of the workpiece. Indeed, the particular configuration of a support surface may be selected in order to adequately support a plurality of workpieces having different configurations, but may not be identical to the configuration of any one or all of such workpieces. Accordingly, this detailed description of preferred embodiments is to be taken in an illustrative, as opposed to a limiting sense.

What is claimed is:

1. An apparatus for shearing workpieces having a plurality of sides formed of sheet-like material, comprising:

a base including a base support surface for supporting one side of a workpiece, wherein the base support surface defines an elongated blade gap, and two elongated edges extending along opposite sides of the elongated blade gap relative to each other, wherein each elongated edge defines a respective elongated blade for cutting a workpiece;

two first supports mounted on the base and further defining the blade gap therebetween, wherein each first support is movable laterally over the base support surface and defines a first support surface engageable with a respective side of a workpiece;

two second supports mounted on the base and further defining the blade gap therebetween, wherein each second support is movable laterally over the base support surface and defines a second support surface engageable with a respective side of the workpiece, the second support surface being spaced apart from and facing the first support surface, wherein the base support surface defines a continuous support surface extending between and beneath the first and second support surfaces, the first, second and third support surfaces define a channel for receiving and supporting the workpiece, and at least one of the first and second support surfaces is movable over the base support surface relative to the other for engaging with each support surface the respective sides of workpieces of different widths; and a cutting blade slidably received within the blade gap and movable between a first position spaced away from the workpiece received within the channel, and a second position in engagement with the workpiece for shearing the workpiece along a line of contact.

2. An apparatus as defined in claim 1, wherein at least one of the first and second supports includes a plurality of elongated edges, each defining a respective elongated blade, and each elongated blade is movable relative to the base support surface into a respective cutting position extending along and further defining the blade gap for cooperating with the cutting blade and shearing the workpiece.

3. An apparatus as defined in claim 2, wherein each support includes at least one blade bar defining a plurality of said elongated edges and being removably mounted to the respective support for presenting each of the plurality of elongated edges to the blade gap.

4. An apparatus as defined in claim 1, wherein the base includes at least one blade bar defining a plurality of elongated edges forming elongated blades, and being removably mounted to the base for presenting each of the plurality of elongated edges to the blade gap.

5. An apparatus as defined in claim 1, wherein the base includes:

two base supports spaced relative to each other and defining the blade gap therebetween, wherein each base support defines the base support surface, and each first support is mounted on a respective base support and each second support is mounted on a respective base support.

6. An apparatus as defined in claim 5, wherein the respective pairs of first and second supports are movable relative to each other over the base support surface for accommodating workpieces of different widths.

7. An apparatus as defined in claim 5, wherein each base support defines an elongated mounting recess spaced apart from and oriented approximately parallel to the blade gap, and each of the first and second supports defines a mounting surface slidably received within the respective mounting recess for laterally moving each of the first and second supports relative to the others.

8. An apparatus as defined in claim 1, wherein the blade includes at least one approximately planar surface defining an elongated cutting edge.

9. An apparatus as defined in claim 8, wherein the elongated cutting edge defines a generally V-shaped edge configuration.

10. An apparatus as defined in claim 1, wherein each of the first, second and base support surfaces defines an approximately planar surface for supporting a respective side of the workpiece.

11. An apparatus as defined in claim 10, wherein the first and second support surfaces are each oriented approximately perpendicular to the base support surface.

12. An apparatus as defined in claim 1, wherein at least one of the first and second supports defines a plurality of first or second support surfaces, and each support surface is formed by a respective side of the support; and the at least one first or second support is removably mounted to the base for presenting each of the plurality of first or second support surfaces to the workpiece received within the channel for engaging the workpiece.

13. An apparatus as defined in claim 1, wherein (i) each first support surface defines at least one elongated edge further defining the blade gap, and the at least one elongated edge forms an elongated blade for cutting a workpiece, and (ii) each second support surface defines at least one elongated edge further defining the blade gap, and the at least one elongated edge forms an elongated blade for cutting the workpiece.

14. An apparatus as defined in claim 13, wherein the elongated blades of the base support surface extend continuously between and beneath the elongated blades of the first and second supports to thereby define substantially continuous elongated blades formed by the first, second and base supports.

15. An apparatus as defined in claim 1, wherein each of the first and second support surfaces are slidably mounted on the base support surface.

16. An apparatus as defined in claim 15, wherein each first and second support surface extends from approximately the base support surface to the opposite side of the respective support.

17. An apparatus as defined in claim 1, wherein each of the first and second supports is laterally movable over the base support surface relative to the other first and second supports.

18. An apparatus for shearing workpieces having a plurality of sides formed of sheet-like material, comprising:

first means defining at least two first support surfaces engageable with a first side of the workpiece for supporting the workpiece, the two first support surfaces being spaced relative to each other and defining a blade gap therebetween;

second means defining at least two second support surfaces engageable with a second side of the workpiece for supporting the workpiece, the second means being spaced apart from and facing the first means, and the second support surfaces being spaced apart from each other and further defining the blade gap therebetween;

third means defining a third support surface engageable with a third side of the workpiece for supporting the workpiece, the third support surface extending continuously between and beneath the first and second support surfaces, and defining two elongated edges spaced relative to each other and further defining the blade gap therebetween, and the first, second and third support surfaces defining a channel for receiving and contacting with each support surface a respective side of the workpiece;

means for moving at least one of the first and second support surfaces laterally over the third support surface and relative to the other for engaging the respective sides of workpieces of different widths; and means slidably received within the blade gap for shearing the workpiece along a line of contact.

19. An apparatus as defined in claim 18, wherein at least one of the first, second and third means includes means forming a plurality of blade edges for presenting each of the plurality of blade edges to the blade gap receiving the means for shearing the workpiece.

20. An apparatus as defined in claim 18, wherein the means for moving includes at least one elongated recess formed within the third support surface, and a raised mounting surface formed on at least one of the first and second means and slidably received within the recess for sliding at least one of the first and second means within the recess.

21. An apparatus as defined in claim 12, wherein at least one of the plurality of first or second support surfaces is oriented at a different angle with respect to the base support surface than at least one of the other first or second support surfaces for accommodating workpieces of different configurations.

22. An apparatus as defined in claim 1, wherein the angular position of at least one of the first and second support surfaces relative to the base support surface is adjustable for accommodating workpieces of different configurations.

23. An apparatus as defined in claim 18, further comprising means for adjusting the angular position of at least one of the first and second means relative to the third means for receiving within the channel workpieces of different configurations.

24. An apparatus as defined in claim 18, wherein the first means includes a pair of first supports spaced relative to each other and defining the blade gap therebetween, and each first support includes a plurality of first support surfaces, and the second means includes a pair of second supports spaced relative to each other and defining the blade gap therebetween, and each second support includes a plurality of second support surfaces, and the apparatus further includes means for rotatably adjusting the position of each of the first and second supports for presenting each of the support surfaces to the channel to thereby engage a respective side of the workpiece with each support surface.

* * * * *